R. MILNE.
THREAD MILLING MACHINE.
APPLICATION FILED JAN. 8, 1919.

1,400,761.

Patented Dec. 20, 1921.
4 SHEETS—SHEET 2.

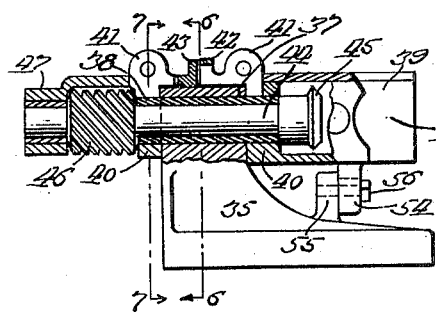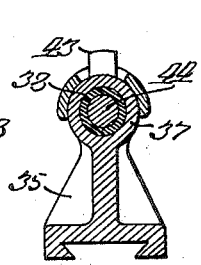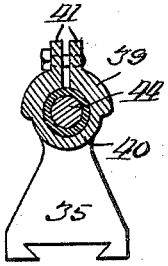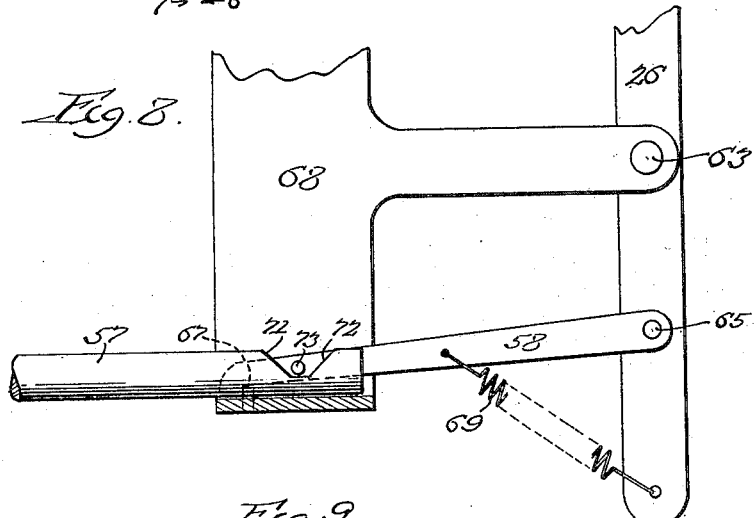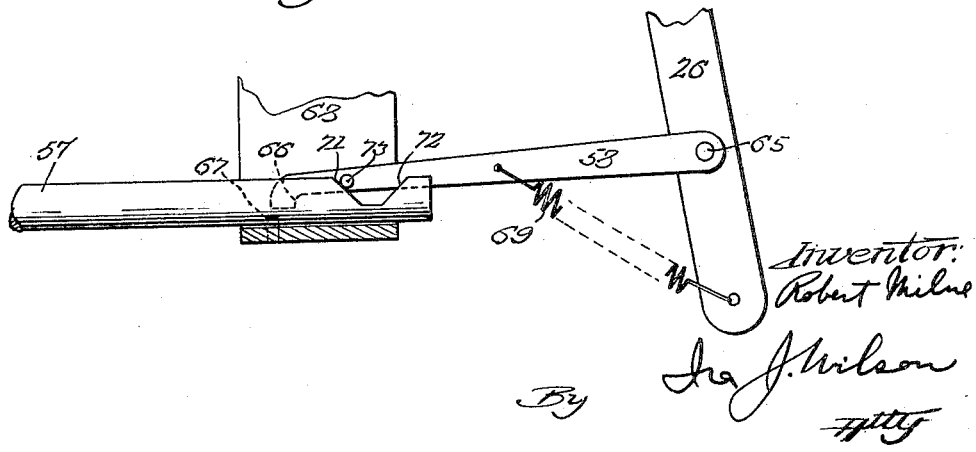

UNITED STATES PATENT OFFICE.

ROBERT MILNE, OF ROCKFORD, ILLINOIS, ASSIGNOR TO THE SAVAGE & LOVE COMPANY, OF ROCKFORD, ILLINOIS, A CORPORATION OF ILLINOIS.

THREAD-MILLING MACHINE.

1,400,761.   Specification of Letters Patent.   Patented Dec. 20, 1921.

Application filed January 8, 1919. Serial No. 270,157.

*To all whom it may concern:*

Be it known that I, ROBERT MILNE, a citizen of the United States, residing at Rockford, in the county of Winnebago and State of Illinois, have invented certain new and useful Improvements in Thread-Milling Machines, of which the following is a specification.

This invention relates to thread milling, that is, to the milling of spirals, worms, and screw threads in metal; and the primary object is to provide a thread milling machine of generally improved construction, especially with the view to simplifying and reducing the operating parts to a minimum and yet obtaining all the adjustments necessary for practical operation in milling threads of various pitches and diameters.

In furtherance of this general object I have aimed to provide a cutter support of novel construction together with an improved means for driving the cutter. This means includes a spiral gear connection advantageously arranged so that the cutter support may be adjusted toward and from the work to accommodate the depth and diameter of the threads and adjusted angularly for the angle of the threads without affecting the coöperative relation of the spiral gears. I have also arranged a main driving shaft in such manner as to enable the drive to be directly transmitted through the agency of spiral gear connections to both the head stock gearing and to the cutter-driving means, thereby eliminating superfluous driving mechanism included in thread milling machines now in common use.

A further object of my invention is to provide a stop device of improved construction whereby the drive may be automatically stopped at a predetermined point in the travel of the cutter carriage in either direction. Other objects and attendant advantages will be appreciated by those skilled in the art as the invention becomes better understood by reference to the following description when considered in connection with the accompanying drawings, in which—

Figure 1:
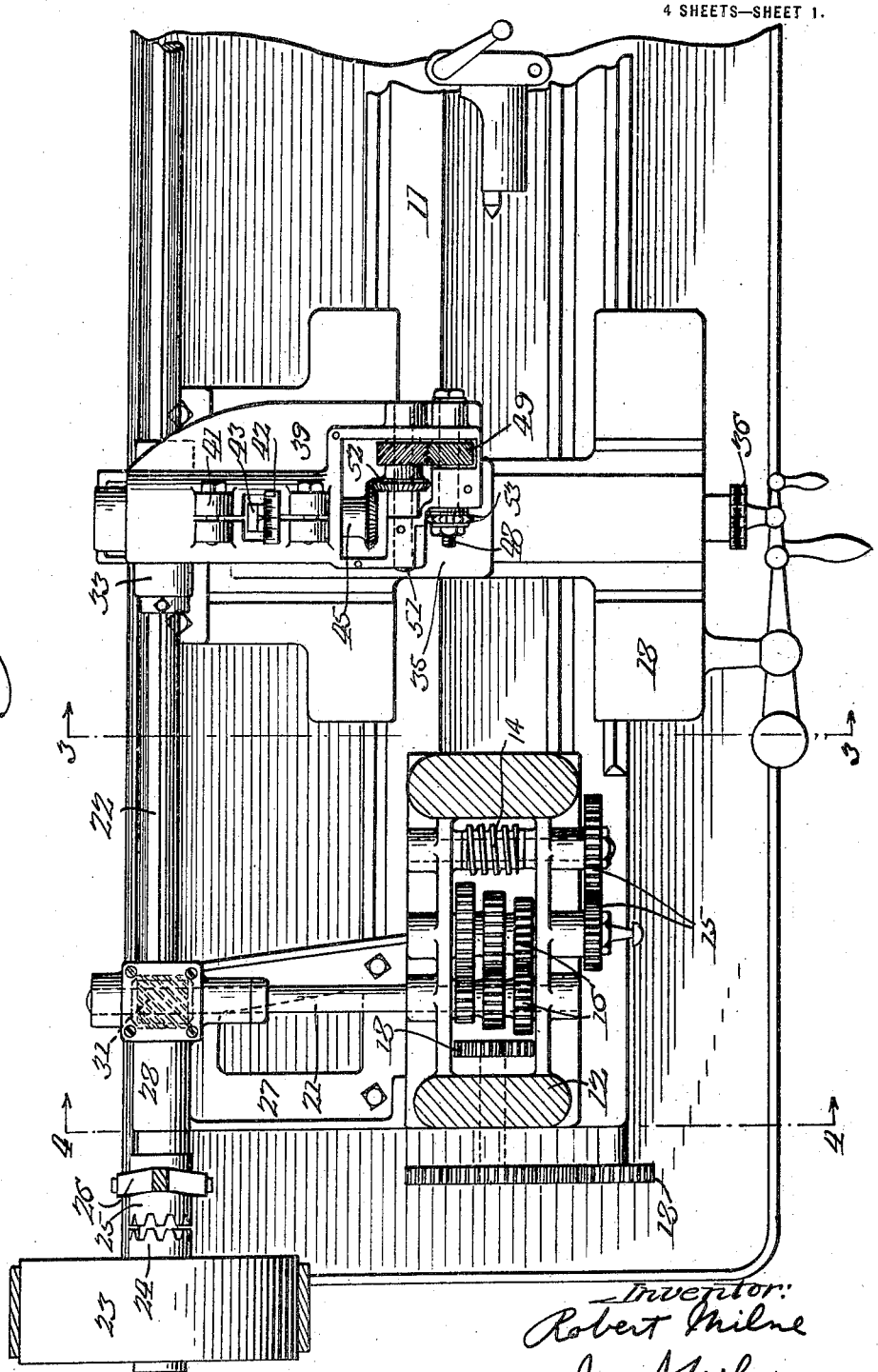
Figure 2:
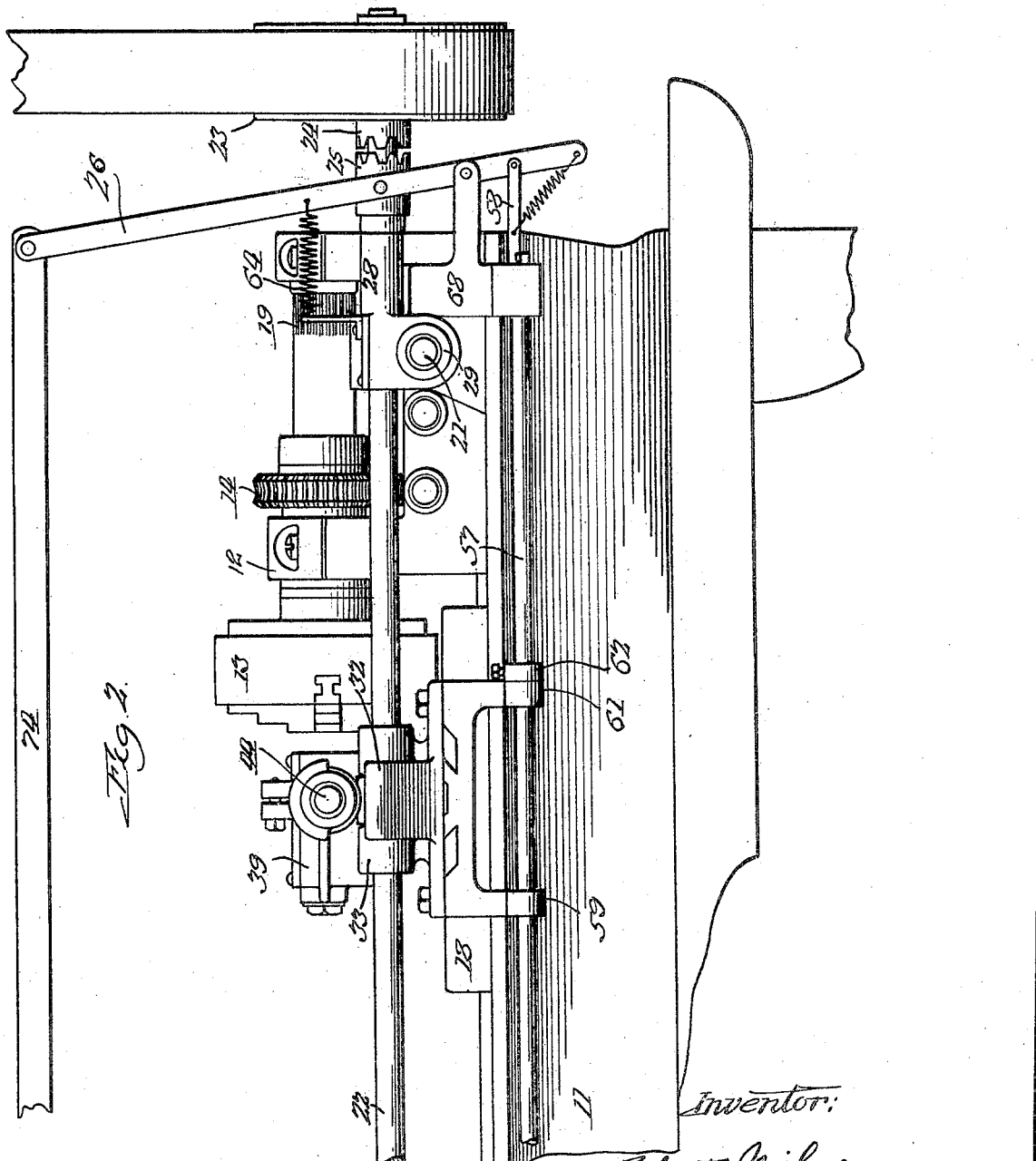
Figure 3:
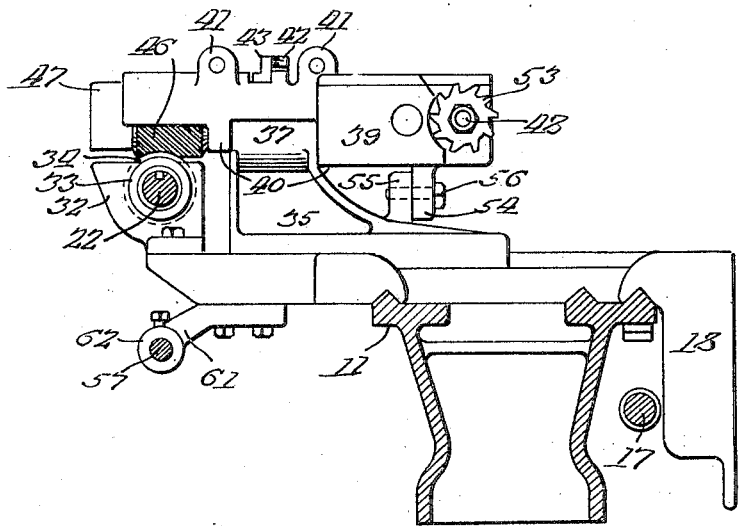
Figure 4:
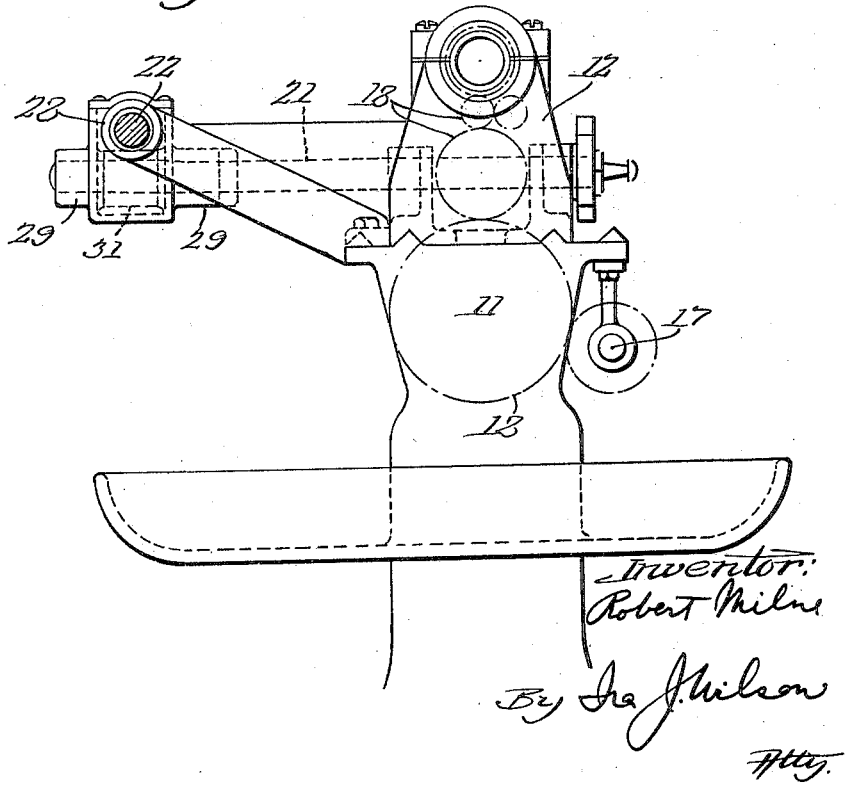

Figure 1 is a plan view, partially in section, of a thread milling machine embodying my improvements;

Fig. 2, a rear elevation of the machine;

Figs. 3 and 4, cross-sectional views taken substantially on the lines 3—3 and 4—4 respectively, of Fig. 1;

Fig. 5, a longitudinal sectional view through the cutter support;

Figs. 6 and 7, cross-sectional views through said support taken substantially on the lines 6—6 and 7—7 respectively, of Fig. 5; and Figs. 8 and 9, fragmentary views of the automatic stop device illustrating the same in normal and stopping positions, respectively.

Before entering into a description of my improvements it might be mentioned that with the exception of certain features mentioned hereinafter, practically any well known form of spindle and lead screw driving means might be employed. Hence, I have illustrated in detail only such parts thereof as relate particularly to my improvements.

Upon a bed 11 is mounted a suitable head stock 12 carrying a spindle and chuck or work carrier 13. In this instance, the spindle is revolved through the agency of a worm gear drive 14, gears 15, and selective change speed gears 16. The lead screw 17 for moving the carriage 18 lengthwise on the bed in the manner well understood in the art, is connected through a train of gearing 18, with the gear 19 on the chuck spindle. Thus, when the shaft 21 carrying the fixed gears of the gearing 16 is revolved the work spindle and lead screw will be respectively revolved at speeds determined by the several trains of gearing. Relative changes in the speed of the work and lead screw may be made to suit the requirements as is well understood in the art, and the present invention is not limited to the form or arrangement of the spindle and lead screw driving mechanism mentioned, since the same has simply been briefly shown for purpose of conveying a more complete understanding of my improvements.

At the rear side of the machine, I have mounted in parallel relation with the bed a driving shaft 22 co-extensive with the length thereof. The shaft 22 is adapted to be driven from a continuously revolving pulley 23 through the agency of a clutch including driving and driven elements 24 and 25 respectively, the latter of which is adapted to be shifted into and out of engagement by means of a shifting lever 26 in a manner described later. The lever 26 carries pins engaging in an annular groove, not shown, in the clutch member 25, whereby the latter will be moved axially by the lever. A suitable journal bracket designated generally by reference character 27, secured to the head end of the machine provides a bearing 28 for the driving shaft 22 and also suitable bearings 29 for the driven shaft 21. This bracket also houses a pair of intermeshing spiral gears 31 fixed respectively to the driving and driven shafts 21 and 22, so that the shafts are in constant driving connection. Obviously, when the shaft 22 is revolved through the agency of the clutch the lead screw and the stock carried by the chuck will be revolved at the proper speeds.

The carriage 18 which travels lengthwise on the shears of the bed and carries the milling cutter may be connected with the lead screw in any suitable manner and moved lengthwise thereby in either direction for producing left or right hand threads, as is well understood in the art. Upon the rear end of the carriage 18 is fixed a suitable casing 32 provided with bearings 33 for the driving shaft 22 and an open-top housing and oil reservoir for a spiral gear 34 interposed between the bearings 33 and splined on the driving shaft 22 so as to revolve therewith and move lengthwise with the carriage 18. A cross slide 35 mounted on the transverse ways on the carriage 18 is adapted to be adjusted on said ways by a suitable cross feed screw, not shown, as the construction is well understood. The usual micrometer adjustment 36 is shown for moving the slide and enabling the same to be adjusted with precision. Referring particularly to Figs. 5, 6, and 7, it will be noted that the cross slide 35 is shaped to provide a cylindrical casing or head 37 in which is fixedly secured a sleeve 38 extending beyond both ends of the head 37 so as to provide supporting bearings for a cutter-supporting head designated generally by reference character 39. This cutter support is shaped to provide annular portions 40 embracing the ends of the sleeve 38 so that the support may be adjusted rotatably about the longitudinal axis of the sleeve. This pivot axis of the cutter support, it will be noted is in a horizontal plane intersecting the axis of rotation of the work and at right angles to the driving shaft 22. The body of the cutter support is parted longitudinally at its top and provided with upstanding ears 41 through which are passed bolts adapted to be tightened for clamping the body rigidly to the sleeve 38 to hold the cutter support fixed in any angularly adjusted position. The cutter support 39 and the slide head 37 are respectively provided with upstanding coöperating segments 42 and 43, the former of which is graduated on its upper surface and the latter provided with a coöperating pointer. A suitable opening is provided in the top of the cutter support so that the latter will not interfere with the stationary pointer support 43 when the cutter support is angularly adjusted. These graduations indicate the angle at which the milling cutter, which will be presently mentioned, may be set with respect to the longitudinal axis of the work when screws of different pitches and diameters are milled. A shaft 44 journaled in the sleeve 38 and extending beyond both ends thereof is equipped at one end with a fixed bevel gear 45 and at its opposite end with a fixed spiral gear 46 in mesh with the spiral gear 34, the adjacent end of the shaft being journaled in a bearing 47 formed integral with the support 39 and holding the spiral gear 46 against lengthwise movement with respect to the support. A cutter arbor 48 revolubly mounted in suitable bearings on the forward end of the support parallel with and in the horizontal plane of the work spindle is provided with a fixed spiral gear 49 meshing with a companion spiral gear loose on an intermediate shaft 51 and fixed to a bevel gear 52, which in turn is in mesh with the bevel gear 45. The arbor 48 is adapted to carry a suitable thread milling cutter or other revoluble metal cutting tool 53. Thus, a driving connection is established between the cutter arbor 48 and driving shaft 22 comprising the spiral gears 34 and 46, shaft 44, bevel gears 45 and 52 and spiral gears 49. As shown in the drawings, the forward end of the cutter support is shaped to suitably house the gearing therein and provide an oil casing therefor, the top of which is closed by a cover. Referring to Fig. 3, it will be noted that the bearing or mounting about which the cutter support is revoluble is disposed entirely at the rear of the drive gearing in the front end of the support and that this front end projects forwardly from the slide head 37. In order that this end may be properly supported and braced so that the cutter will be held rigidly in working position and will not chatter during operation, I have provided a supplemental two-part brace consisting of the coöperating parts 54 and 55 formed integral respectively with the cutter support and the slide and adjustably connected together by a bolt 56. This bolt, threaded in the part 55, passes through an arcuate opening in the part 54 concentric with the pivot axis of the cutter support.

When it is desired to change the angle of the cutter with respect to the work as is necessary when threads of different pitches are cut, the bolts through the ears 41 and the bolt 56 are loosened permitting the cutter support to be adjusted about the sleeve 38 to the required position, whereupon said bolts will be tightened so as to rigidly lock the cutter and its support in set position.
For adjusting the cutter toward and from the work and for setting the cutter to the requisite cutting depth the cross feed adjustment is manipulated to feed the slide 35 crosswise, thus moving the cutter support and the drive mechanism carried thereby as an entirety. It will be noted that these adjustments, that is, for changing the angle of the cutter and for moving the cutter toward and from the work are made without affecting the driving connection between the cutter and driving shaft. In other words, by utilizing spiral gears in the manner shown, the cutter head may be adjusted as required, the spiral gear 46 simply moving longitudinally of its axis relatively to its companion gear 34 without disturbing the driving connection. It will be manifest that the foregoing construction is exceedingly simple, comprising but few parts and yet allowing all the adjustments necessary for the varying conditions in practical operation.

An automatic stop is provided whereby the feed of the cutter carriage and rotation of the work will be stopped at a predetermined point in the travel of the carriage. This automatic stop device, best shown in Figs. 2, 8 and 9, consists of a slide rod 57 substantially co-extensive with the length of the machine, adapted to be actuated by the carriage for releasing or actuating a trip element 58 from a set position holding the clutch engaged. Either one of the depending arms 59 and 61 fixed to the carriage 18 and loosely embracing the rod 57 is adapted to actuate a collar 62 fixed to the shaft 57 for moving the latter lengthwise in the direction in which the carriage is traveling, that is, whether a left or right hand thread is being cut. The clutch shifting lever 26 pivotally mounted at 63 is constantly urged by a contractile spring 64 in a direction to disengage the clutch and is adapted to be normally held in an engaged position by means of the trip member 58 pivoted at 65 to the clutch shifting lever and having a hooked end 66 engaging a fixed stop 67 carried by the stationary bracket 68, the contractile spring 69 holding the trip lever 58 in this set position. It will be readily seen that when the hooked end 66 is raised from the stop 67, the shifting lever 26 will be moved by the spring 64 to disengage the clutch and thus stop the machine. Such raising movement is imparted to the trip lever 58 by longitudinal movement of the rod 57, one end of which is located within the passage through the bracket 68 alongside the lever 58 and is adapted to slide lengthwise through said opening. This end of the rod 57 is provided with opposed inclined cam surfaces 71 and 72 between which is disposed a lug 73 fixed to and projecting laterally from the trip lever 58. It will be evident that when the carriage 18 reaches a certain point in its travel toward the head stock determined by the position of the collar 62, the part 61 will strike the collar, thereby moving the rod 57 lengthwise so as to carry the cam surface 71 against the lug 73 and causing the latter to be moved upwardly so as to withdraw its end 66 from the stop 67, as shown in Fig. 9. When the lever 58 is thus tripped or withdrawn from engagement with the stop 67 the shifting lever 26 will be free to disengage the clutch under the influence of the spring 64. To put the machine in operation again the operator shifts the lever 26 by hand to engage the clutch, a horizontal pole 74 attached to the upper end of the lever 26 being provided so that the operator standing at any position in front of the machine may reach over the bed, grasp the pole and move the same lengthwise. When a screw of the opposite lead is being cut the carriage 18 will actuate the rod 57 when moved away from the head stock and in such instance the cam surface 72 on the rod 57 will trip the lever 58.

I claim:

1. In a machine of the character described, the combination with a bed, a carriage movable longitudinally thereon, and means for moving the carriage longitudinally, of means for driving said carriage-moving means and for automatically stopping the drive when the carriage has reached a predetermined point comprising a driving and a driven member adapted to be connected by a clutch, a clutch shifting lever, a lengthwise movable member substantially co-extensive with the length of travel of the cutter carriage, means adapted to normally hold the shifting lever in a clutch engaged position and being releasable so as to cause the clutch to be disengaged, said lengthwise movable member and said clutch operating means being coöperatively arranged and constructed so that when said member is moved in either direction it will actuate said means and cause the clutch to be disengaged, and means whereby said member may be actuated by the carriage at any given point in its travel in either direction so as to automatically release or disengage the clutch at any given point.

2. In a machine of the character described, the combination of relatively movable work and tool carriers, one of which is revoluble, of driving means for revolving the latter carrier and for feeding one of the carriers toward and from the other, and means for automatically stopping the feed of said movable carrier comprising a clutch, a clutch shifter, means exerting a pressure on the clutch shifter constantly urging the same in a direction to disengage the clutch, an element adapted to be actuated by the feed movement of the movable carrier, and a trip element connected with said clutch shifter and adapted to be held in a set position for holding the clutch shifter in a clutch-engaged position, the trip element and actuable element being coöperatively arranged so that the latter upon being actuated will trip the former and allow the clutch shifter to disengage the clutch under the influence of said pressure means.

3. In a machine of the character described, the combination of relatively movable work and tool carriers, one of which is revoluble, of driving means for revolving the latter carrier and for feeding one of the carriers toward and from the other, and means for automatically stopping the feed of said movable carrier comprising a clutch, a clutch shifter, means exerting a pressure on the clutch shifter constantly urging the same in a direction to disengage the clutch, an element adapted to be actuated by the feed movement of the movable carrier, opposed cam surfaces adapted to be moved by said element, and a trip element connected with said clutch shifter and adapted to be held in a set position for holding the clutch shifter in a clutch-engaged position, the trip element having connected therewith a part disposed intermediate said opposed cam surfaces so that the actuable member upon being moved in either direction will release said trip element from set position by cam action, thereby allowing the clutch shifter to be moved to clutch-disengaging position under the influence of said pressure means.

ROBERT MILNE.